(12) United States Patent
Sipple et al.

(10) Patent No.: US 6,662,307 B1
(45) Date of Patent: Dec. 9, 2003

(54) DISK RECOVERY/RECONSTRUCTION

(75) Inventors: Ralph E. Sipple, Shoreview, MN (US); Michael J. Hill, Vadnais Heights, MN (US); Dennis R. Konrad, Welch, MN (US)

(73) Assignee: Unisys Corporation

( * ) Notice: Subject to any disclaimer, the term of this patent is extended or adjusted under 35 U.S.C. 154(b) by 0 days.

(21) Appl. No.: 08/076,587

(22) Filed: Jun. 14, 1993

(51) Int. Cl.$^7$ ................................................. G06F 11/34
(52) U.S. Cl. ................................. 714/2; 714/6
(58) Field of Search ..................... 395/575, 425, 395/725, 600, 181, 182.01; 371/10.1, 8.1, 7; 340/172.5; 445/1; 714/2, 6, 15, 710

(56) References Cited

U.S. PATENT DOCUMENTS

| | | | |
|---|---|---|---|
| 4,020,466 A | 4/1977 | Cordi et al. | 340/172.5 |
| 4,084,231 A | 4/1978 | Capozzi et al. | 364/200 |
| 4,646,229 A * | 2/1987 | Boyle | 364/200 |
| 4,853,843 A * | 8/1989 | Ecklund | 364/200 |
| 5,032,979 A * | 7/1991 | Hecht et al. | 364/200 |
| 5,089,958 A | 2/1992 | Horton et al. | 395/575 |
| 5,093,787 A * | 3/1992 | Simmons | 364/406 |
| 5,307,484 A * | 4/1994 | Baker et al. | 395/600 |

OTHER PUBLICATIONS

Tang et al "A Scheme for Maintaining Consistency and Availability of Replicated Flies in a Partitioned Distributed System" IEEE, 1989, pp. 530–537.*

Gray et al., "The Recovery Manageer of the System R Database Manager", *Computing Surveys*, vol. 13, No. 2, Jun. 1981, pp. 223–242.

Kaunitz and Van Ekert, "Audit Trail Compaction for Database Recovery", *Communications of the ACM*, vol. 27, No. 7, Jul. 1984, pp. 678–683

* cited by examiner

*Primary Examiner*—Phung M. Chung
(74) *Attorney, Agent, or Firm*—Charles A. Johnson; Mark T. Starr; Nawrocki, Rooney & Sivertson

(57) ABSTRACT

An apparatus and method of efficiently recovering from physical disk drive (or logical file) failures in transaction based digital data processing systems. As transactions are sequentially processed, compacted audit trail records are prepared to indicate modifications resulting from each transaction. The audit trail records are stored in storage areas on a disk drive in accordance with the physical data base disk drive(s) or logical file(s) to which the corresponding transaction refers. A physical disk drive or logical file is dumped to magnetic tape whenever the associated audit trail storage area is full, thus clearing the audit trail storage area for further use. When a physical disk drive or logical file fails, the most recent dump is read. Modifications to each file of the dump are made as compacted audit trail data is processed. The modified files are destaged to a spare disk drive.

25 Claims, 11 Drawing Sheets

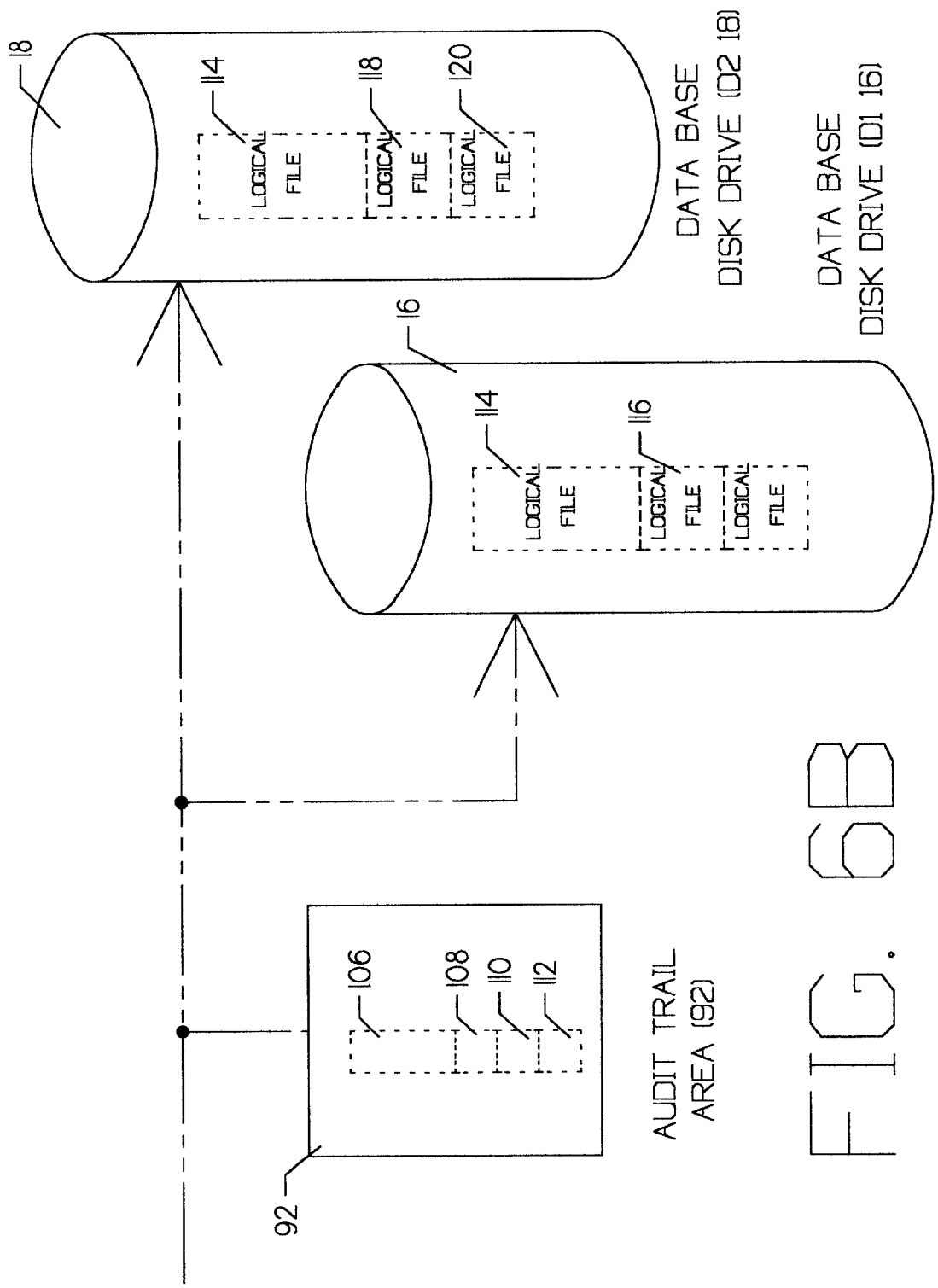

DISK RECOVERY/RECONSTRUCTION

CROSS REFERENCE TO CO-PENDING APPLICATIONS

U.S. patent application Ser. No. 07/975,38 now U.S. Pat. No. 5,463,666, filed Nov. 13, 1992, and entitled Resilient Storage System, is assigned to the assignee of the present invention and incorporated herein by reference.

BACKGROUND OF THE INVENTION

1. Field of the Invention

The present invention most generally relates to digital data processing systems and more particularly relates to recovery from disk failures in transaction oriented digital data processing systems.

2. Description of the Prior Art

It has been known for some time to utilize large scale digital data processing systems for real time posting of transactions from a large number of terminals or work stations to a single or small number of related data bases. Real time banking, airline reservations, and theater ticketing are examples of applications for such data processing systems.

One particularly difficult problem with such transaction based systems is the need to protect against loss of a portion of the data base and the corresponding transactions through unrecoverable disk errors and/or data base corruption. Most often such problems result from failures of the storage hardware and/or associated switching equipment or from errors in new software.

The simplest form of data recovery employs redundant storage of the data base. U.S. Pat. No. 4,084,231, issued to Capozzi et al., utilizes redundant storage hardware for that purpose. Unfortunately, such complete redundancy is too costly for any but the smallest data storage capacities. Because of the cost, many applications employ such redundancy only for particularly critical data. U.S. Pat. No. 5,089,958, issued to Horton et al., teaches redundant storage of machine state values.

A somewhat more cost effective means of utilizing redundancy is through the storage of only data changes rather than storage of the complete data base. U.S. Pat. No. 4,020,466, issued to Cordi et al., has copy back store at each level of a hierarchical memory system to save changes to the main storage at that level. Whereas this approach is less costly than complete redundancy, it is still too costly for very large scale systems. "Recovery Techniques For Database Systems", by Joost B. M. Verhofstad, *Computing Surveys*, Vol. 30, No. 3, June 1978, provides a theoretical analysis for the various common approaches to recovery of data bases following hardware failure. A specific data recovery capability is postulated in "The Recovery Manager of the System R Database Manager", by Jim Gray et al., *Computing Surveys*, Vol. 13, No. 2, June 1981. At section 2.9, Gray et al. recommend that failures of the data base storage media be accommodated through the use of periodic dumps to mass storage along with a simple audit trail to sequentially record each transaction. Not addressed by Gray et al. is the extraordinary length of time required to actually achieve data base recovery in this manner.

Improvements to the audit trail approach are suggested in "Audit Trail Compaction for Database Recovery", John Kaunitz et al., *Communications of the ACM*, Volume 27, Number 7, July 1984. Though no particular implementation is taught, Kaunitz et al. do postulate that recovery time could be enhanced by compaction of the audit trail information and by elimination of redundant and unnecessary entries.

Though the prior art does show the posting of audit trail entries to a periodic data base dump for the purposes of recovery from media failures, no accommodation of the extensive recovery time is shown, except for rudimentary compaction of the audit trail entries. For very large scale systems, rapid recovery is necessary to prevent the system from swamping due to the continuing real time transaction inputs during the recovery period.

SUMMARY OF THE INVENTION

The present invention overcomes the disadvantages found in the prior art by providing the apparatus for and method of efficiently taking periodic data base dumps and maintaining an audit trail for rapid recovery from data base media failures.

In the preferred mode, and not to be deemed limiting of the present invention, four basic factors directly contribute to improved efficiency. Two of these occur during normal operation of the audit trail recording process and the other two are found during data base recovery following a storage medium failure.

Unlike the prior art systems, the preferred mode of the present invention does not simply save all transactions in serial fashion in the order processed in a single audit trail storage facility. Instead, the audit trail information is segregated according to which physical storage facility or logical file it relates. In this manner, all audit trail data for a given disk drive, for example, is stored together and is separated from the audit trail information which relates to different physical disk drives. In this fashion recovery from a physical disk drive or logical file failure necessitates access only to the audit trail information corresponding to that physical disk drive or logical file. No audit trail data relating to other disk drives or logical files need be accessed. Furthermore, data compaction of the audit trail transaction data provides smaller audit trail storage requirements during normal operation and quicker recovery as is explained below.

A second normal run time feature is directed to the data base dump process. In addition to segregating data base dumps by physical data base storage facility or logical file, the timing of these dumps is directly determined by activity at the individual disk drives or logical files. In the preferred mode for a given physical disk drive or logical file, this is determined by the rate of filling of the associated audit trail information storage space. Whenever, the audit trail storage area becomes filled, the corresponding physical disk drive or logical file is dumped and that audit trail storage area is released to be refilled. As a result, the most active physical disk drives or logical files are dumped the most often. This prevents unnecessary dumping of relatively inactive physical disk drives or logical files and ensures that dumping is only performed when necessary.

At recovery time, only the data base dump and audit trail information associated with the failed physical disk drive or logical file are accessed. Because the audit trail data has been sufficiently compacted and segregated during online operation of the present invention, it can be readily retrieved and stored in audit memory in time sequential order. As each file's records or pages are read into a data base memory buffer from the data base dump tape, the associated audit trail data is fetched from audit memory, the required changes are made by sequentially applying the audits to the data base memory buffer with the last change being applied last to reflect the latest state of the subject file's records or pages, and the updated records or pages are written from the data base memory buffer to the output device (e.g. spare disk drive). Thus the complete recovery can be accomplished in essentially the time required to read the magnetic dump tape.

A further improvement may be provided by storage of the changed words of the data base entries and file indices rather than the transaction inputs. This speeds the recovery process by providing a simple substitution of the changed words of the data base entries rather than requiring the processing needed to actually post each transaction. However, this approach requires that the compacted audit trail information be time ordered to permit exclusion of the obsolete entries and provide actual data base changes only for the most recent transactions.

As can be readily seen, each of these enhancements greatly reduces the time required to recover from the failure of a physical disk or logical file and provides reduced process and hardware requirements during normal operation and the recovery process.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 6B is a schematic diagram showing storage of the audit trail information of a logical data base file according to the preferred mode of the present invention;

DETAILED DESCRIPTION OF THE PREFERRED EMBODIMENTS

Figure 1:
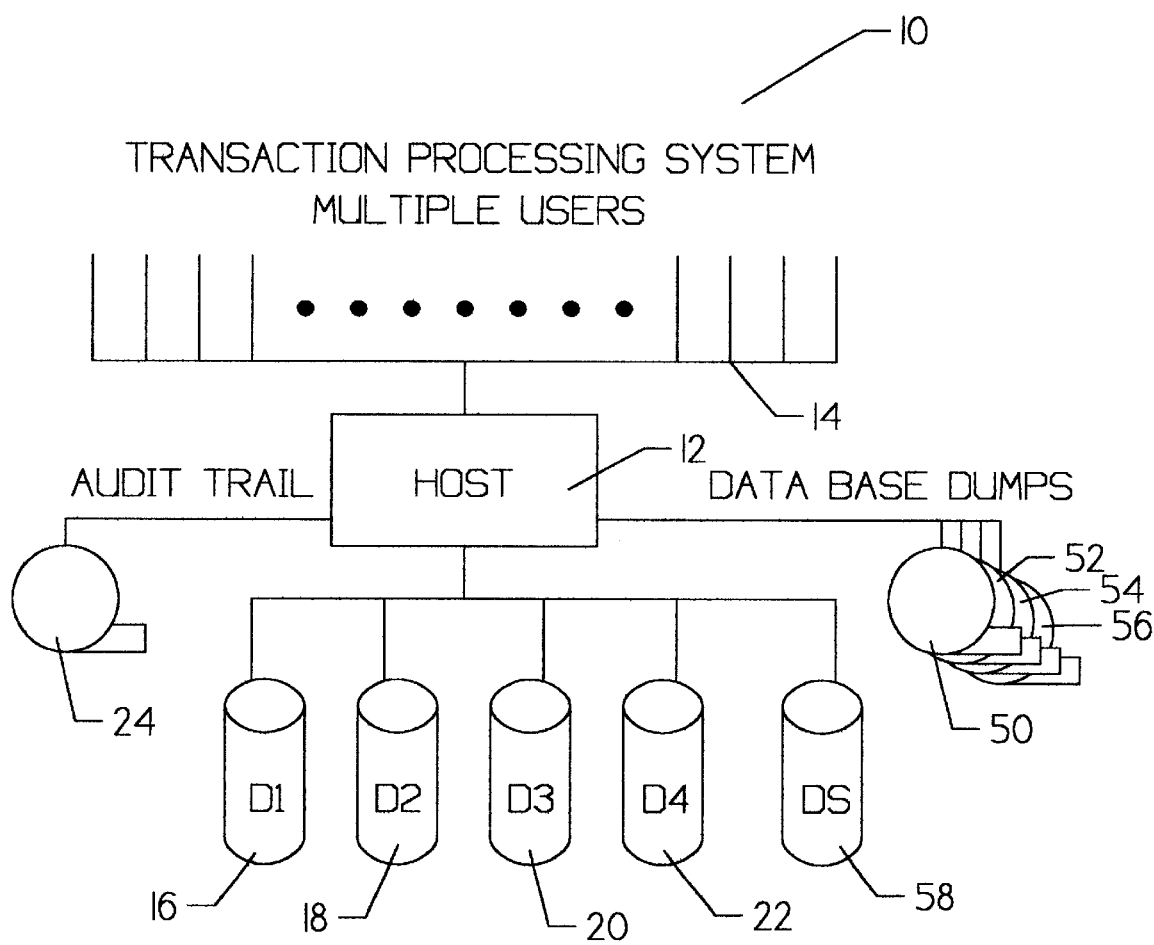
FIG. 1 is a block diagram of a typical prior art transaction based data processing system.

FIG. 1 is a block diagram showing a typical prior art transaction based digital data processing system 10. Multiple users 14 enter transactions in real time to host computer 12. In actual systems of this type, multiple users 14 may include hundreds to thousands of individual input/output terminals or work stations. Ordinarily, each of these individual input/output terminals comprises an industry standard personal computer having at least a video display and standard keyboard. However, the present invention should not be deemed limited to any such configuration.

Host computer 12 receives and processes each of the transactions from multiple users 14 resulting in modifications to the main data base. In this particular example and not to be deemed limiting, the main data base is stored on four major disk drives D1, D2, D3, and D4, designated drives 16, 18, 20, and 22. Drive 58 is a spare disk drive, which is only used in the event of a failure of one of drives 16, 18, 20, or 22.

In accordance with the teaching found in the prior art, the contents of the four major disk drives D1 16, D2 18, D3 20, and D4 22 are periodically dumped to magnetic dump tapes 50, 52, 54, and 56, respectively. Only four dump tapes are shown for clarity, but present day disk drives may hold from five to ten times as much data as one dump tape. At the time of this dump, the portion of the data base dumped is redundantly stored in the dump tapes. The periodicity is ordinarily determined by a trade off of recovery time versus impact on the system to do the data base dumping.

Magnetic tape 24 stores an audit trail in accordance with the prior art. Each of the transactions is stored sequentially on magnetic tape 24 ordered by time of receipt and processing.

An unrecoverable failure of any of the major disk drives D1 16, D2 18, D3 20, or D4 22 causes entry into the recovery mode. At that time the contents of the magnetic dump tapes 50, 52, 54, or 56 corresponding to the failed disk or logical file are transferred to the spare disk drive 58. Audit trail magnetic tape(s) 24 is rewound to the point at which is stored the first transaction occurring after the last dump was made. When multiple audit trail tapes are involved, the current audit trail tape is rewound and the previous audit trail magnetic tape(s) are loaded and searched to locate the recovery point. The transaction records of audit trail magnetic tape 24 (or its predecessors) are individually read and those which affect the portion of the data base now stored on spare disk drive 58 are posted. After posting all of such transactions, the system is deemed to have completely recovered from the failure of a physical disk drive.

Figure 2:
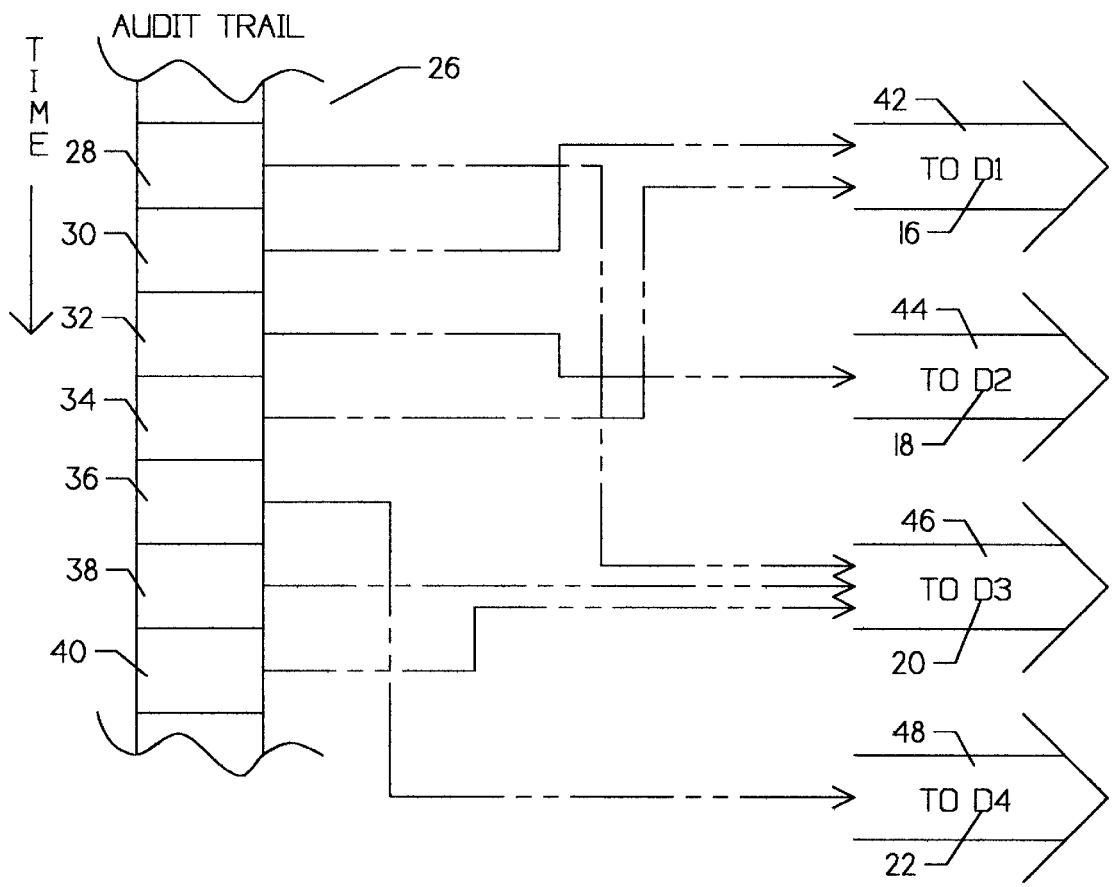
FIG. 2 is a schematic diagram relating the audit trail and data base information in the typical prior art system.

FIG. 2 is a schematic diagram showing the relationship of transactions stored within audit trail 26 and the physical location of the data base elements to which they are related for the prior art system of FIG. 1. Audit trail 26 is stored on magnetic tape 24 (see also FIG. 1). Audit trail 26 consists of a sequence of transaction audits 28, 30, 32, 34, 36, 38, and 40, which are stored in the order that the associated transactions are processed with transaction audit 40 being processed after transaction audit 38. Similarly, transaction audit 38 was made after transaction audit 36, and so forth.

Path 42 is the logical data flow from audit trail 26 to disk drive D1 16 (see also FIG. 1). Similarly, paths 44, 46, and 48 are the logical data flows from audit trail 26 to disk drives D2 18, D3 20, and D4 22, respectively. It can be readily seen that the order of transaction audits of audit trail 26 is not directly related to the physical disk drives to which the transaction audits correspond. For example, transaction audit 40 corresponds to disk drive D3 20, as do transaction audits 38 and 28. Transaction audit 36 corresponds to disk drive D4 22, whereas transaction audit 32 corresponds to disk drive D2 18. Both transaction audits 34 and 30 correspond to disk drive D1 16.

This situation occurs because the transactions are processed sequentially, but their accesses to the data base are not necessarily in any particular order with respect to the physical disk drives. Though this makes preparation of audit trail 26 easily accomplished, it can be readily seen that it complicates the recovery process. If one of the physical disk drives has failed, all transaction audits of audit trail 26 must be read and analyzed for applicability to the recovery process.

Figure 3:
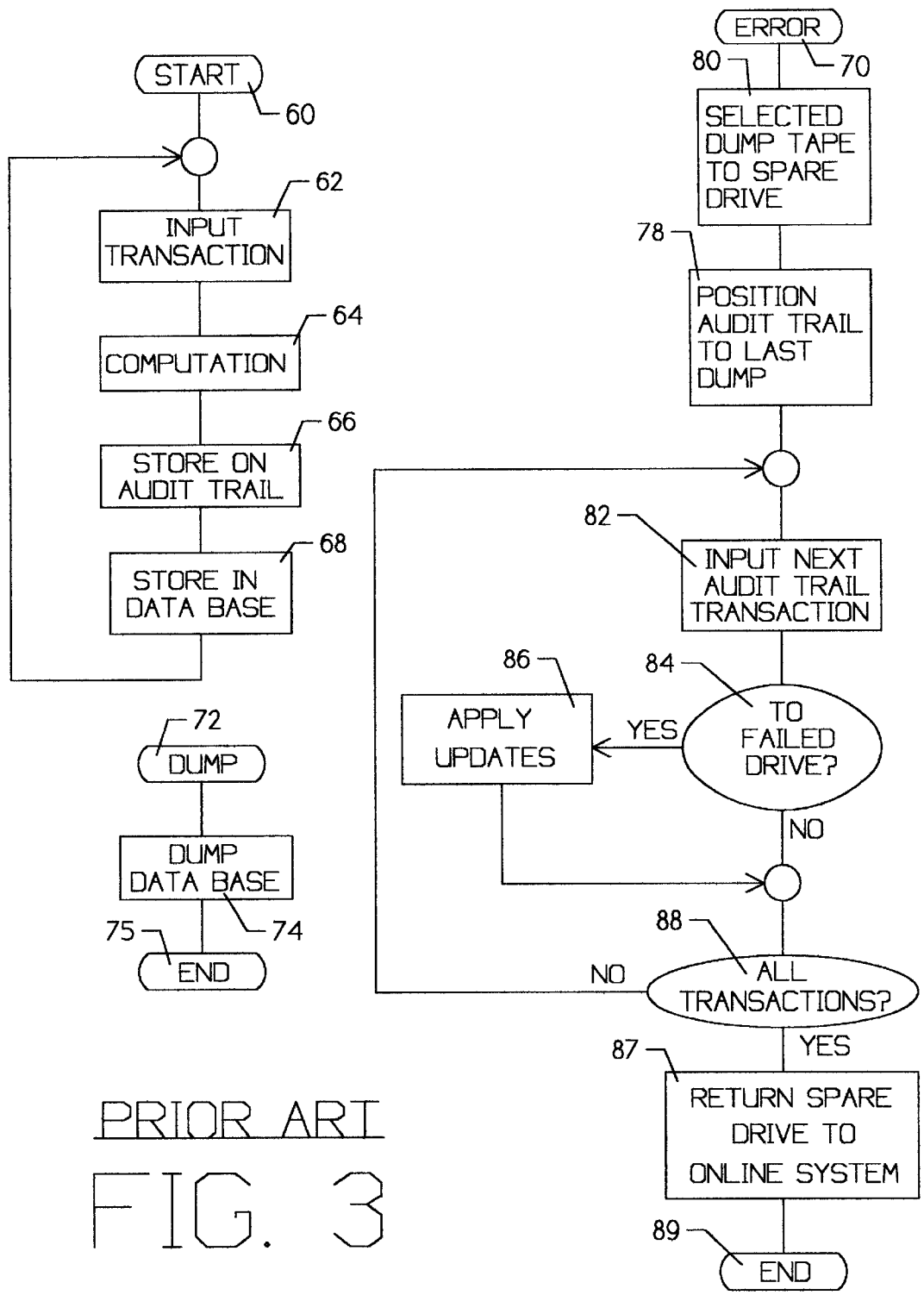
FIG. 3 is a flow chart for audit trail processing and data base recovery in the typical prior art system.

FIG. 3 is a flow diagram for the logical control of the online and recovery capability of the typical prior art system. Entry is via element 60. Each of the transactions from multiple users 14 (see also FIG. 1) is received at element 62 and processed at element 64. The data associated with the transaction is also stored on magnetic tape 24 (i.e. audit trail 26) at element 66. Element 68 provides the actual data base update to the corresponding physical disk drive. This is the normal transaction processing operation which continues independently of the actual recovery operations.

Entry to the data base dump operation is via element 72. Ordinarily for prior art systems, the system administrator determines when it is time to dump the data base to the magnetic dump tapes 50, 52, 54, and 56 (see also FIG. 1) on the basis of time elapsed since the last data dump. When the dump operation has been initiated, element 74 transfers the contents of the selected disk drives D1 16, D2 18, D3 20, and D4 22 to magnetic dump tapes 50, 52, 54, and/or 56, respectively (see also FIG. 1). Exit is via element 75. The data base dump is dynamic and occurs concurrently with transaction processing.

Should it be determined that an unrecoverable disk hardware failure has occurred, control is given to element 70, ordinarily by the system administrator, to begin the data base recovery process. Element 80 transfers the contents of the magnetic dump tape(s) (i.e. 50, 52, 54, or 56) corresponding to the failed disk drive (i.e. D1 16, D2 18, D3 20, or D4 22) to spare disk drive 58 (see also FIG. 1). Magnetic tape(s) 24 containing audit trail 26 is positioned by element 78 to the point at which the first transaction audit after the most recent data base dump can be read. Element 82 reads the next transaction audit from audit trail 26 (see also FIG. 2). If element 84 determines that the transaction audit pertains to the portion of the data base stored on the failed physical disk drive, control is given to element 86 to post the transaction updates to the data base which is now stored on spare disk drive 58. This posting of updates typically involves buffering each transaction's data base audits until encountering a subsequent audit which indicates if the transaction completed successfully or not, and then only if successful for each buffered data base audit reading the adjoining data, updating the attached data, and writing the entire data back to the disk drive. Element 88 ensures that control is returned to element 82 until all transaction audits are processed. When the last transaction audit is processed, the recovery is complete, and the spare disk drive 58 is made available to the online system to resume normal operation at element 87. Exit is via element 89.

Figure 4:
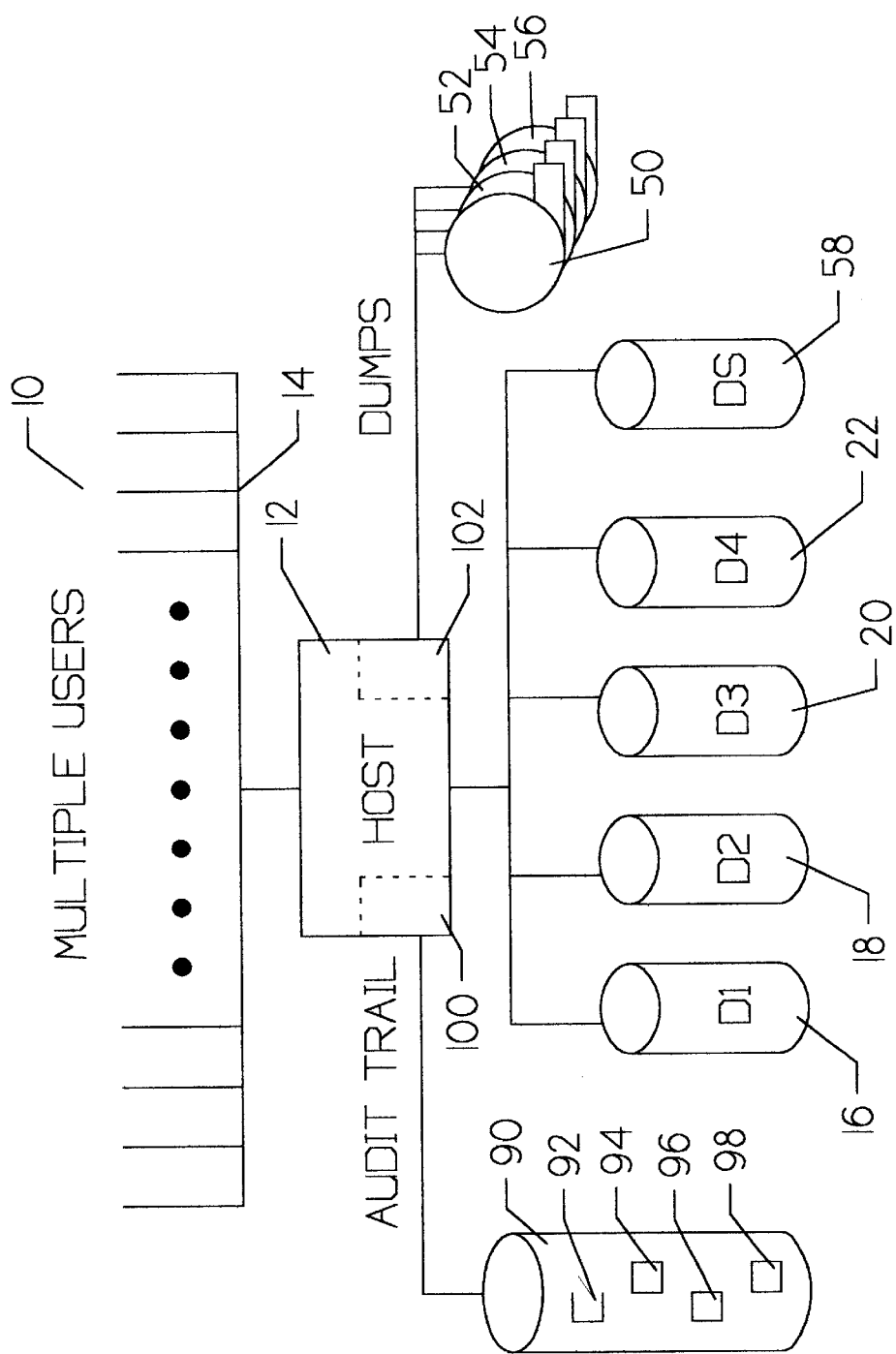
FIG. 4 is a block diagram of a transaction based data processing system according to the preferred mode of the present invention.

FIG. 4 is a block diagram of a transaction based digital data processing system employing the present invention. With the exception of the system audit trail 90 and host elements 100 and 102, the transaction based digital data processing system is much like the prior art data processing system (see also FIG. 1).

The data base transfers from disk drives D1 16, D2 18, D3 20, and D4 22 to magnetic dump tapes 50, 52, 54, and 56, respectively, are treated in the same fashion as in the data processing system of FIG. 1 as discussed above, except that the dumps are not performed periodically. According to the present invention, element 102 determines whenever a particular audit trail storage area is about to be filled. Prior to filling of the audit trail storage area, the contents of the associated physical disk drive (i.e., D1 16, D2 18, D3 20, or D4 22) are transferred to the corresponding magnetic dump tapes (i.e. 50, 52, 54, or 56). This process is discussed -in more detail below.

In the preferred mode of the present invention, magnetic tape 24 (see also FIG. 1) is replaced with audit trail disk drive 90 as shown. As is explained in more detail below (see also FIG. 7), the transactions are processed using an extended complex resilient memory file accelerator. The file accelerator makes it feasible to use audit trail disk drive 90 in the present invention because it provides data base audit compaction as well as data base audit buffering until transaction completion. Compaction of the audit trail information makes it viable to use disk storage to retain the many magnetic tapes worth of transaction audits which typically occur between data base dumps. Disk drive 90 may be composed of one or more physical disk drives in order to accommodate a sufficient number of transaction audits. File accelerator audit buffering makes it viable to efficiently sort the data base audits and store them together with the transactions's completion status in appropriate audit trail storage areas.

Utilization of random access disk drive 90 under control of element 100 is important because the audit trail information is not stored on sequentially accessed media in the present invention. Logical audit storage area 92 of disk drive 90 is reserved for storage of audit trail information associated with disk drive D1 16. Similarly, logical audit storage areas 94, 96, and 98 are reserved for storage of audit trail information associated with disk drives D2 18, D3 20, and D4 22, respectively. As a matter of design choice with the present invention, the physical sizes of the logical audit storage areas 92, 94, 96, and 98 of disk drive 90 can be proportioned to accommodate differing rates of transaction audit volumes to the data base disk drives D1 16, D2 18, D3 20, and D4 22, respectively. As is explained below in greater detail, such segregation of the audit trail information on the basis of corresponding randomly accessed physical disk drive means that during recovery operations, only relevant audit trail information need be accessed. All other referenced elements are as previously described.

The present invention is not limited to segregation of audit trail information by physical disk as described above. For example, the logical audit storage areas 92, 94, 96, 98 of disk drive 90 under the control of element 100 could be reserved for audit trail information related to different logical files rather than to different physical disk drives. This is explained below in greater detail (see also FIG. 6B).

Figure 5:
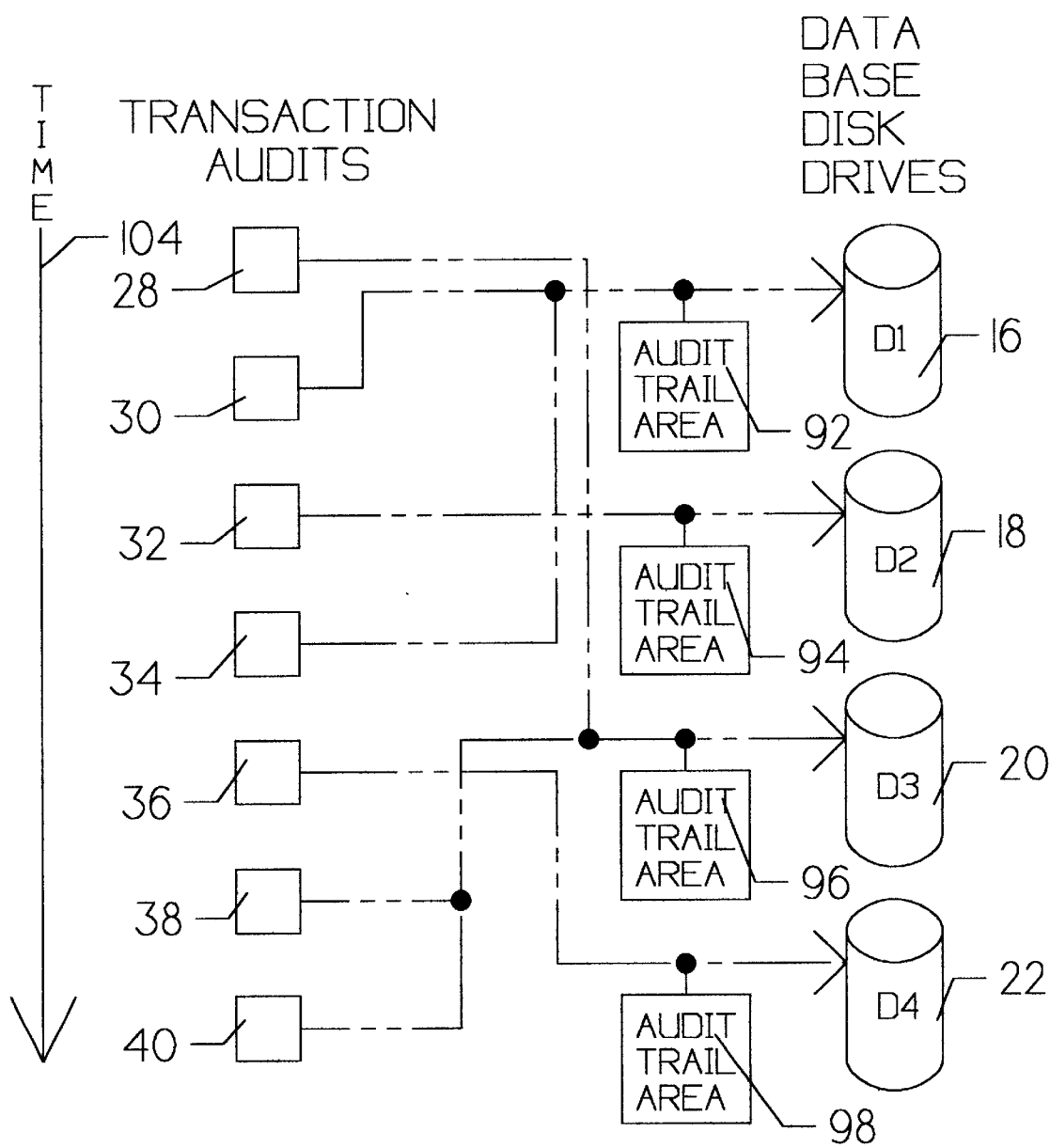
FIG. 5 is a schematic diagram showing the relationship of the audit trail and data base information according to the preferred mode of the present invention.

FIG. 5 is a schematic diagram showing the relationship of storage of audit trail information to corresponding physical disk drives. Here audit trail transaction audits 28, 30, 32, 34, 36, 38, and 40 are shown as arranged in the order processed in accordance with time arrow 104. However, instead of being sequentially recorded directly on an audit trail magnetic tape as found in the prior art, each transaction audit is compacted as discussed below and written in the audit trail information area (i.e. 92, 94, 96, or 98) of disk drive 90 (see also FIG. 4) associated with the disk drive (i.e., D1 16, D2 18, D3 20, or D4 22) corresponding to the actual transaction. As a result the compacted audit trail information is segregated according to the physical disk drive to which it relates.

The present invention is not limited to segregation of audit trail information by physical disk as described above.

For example, the logical audit storage areas 92, 94, 96, and 98 of disk drive 90 under the control of element 100 (see FIG. 4) could be reserved for audit trail information related to different logical files rather than to different physical disk drives.

Figure 6:
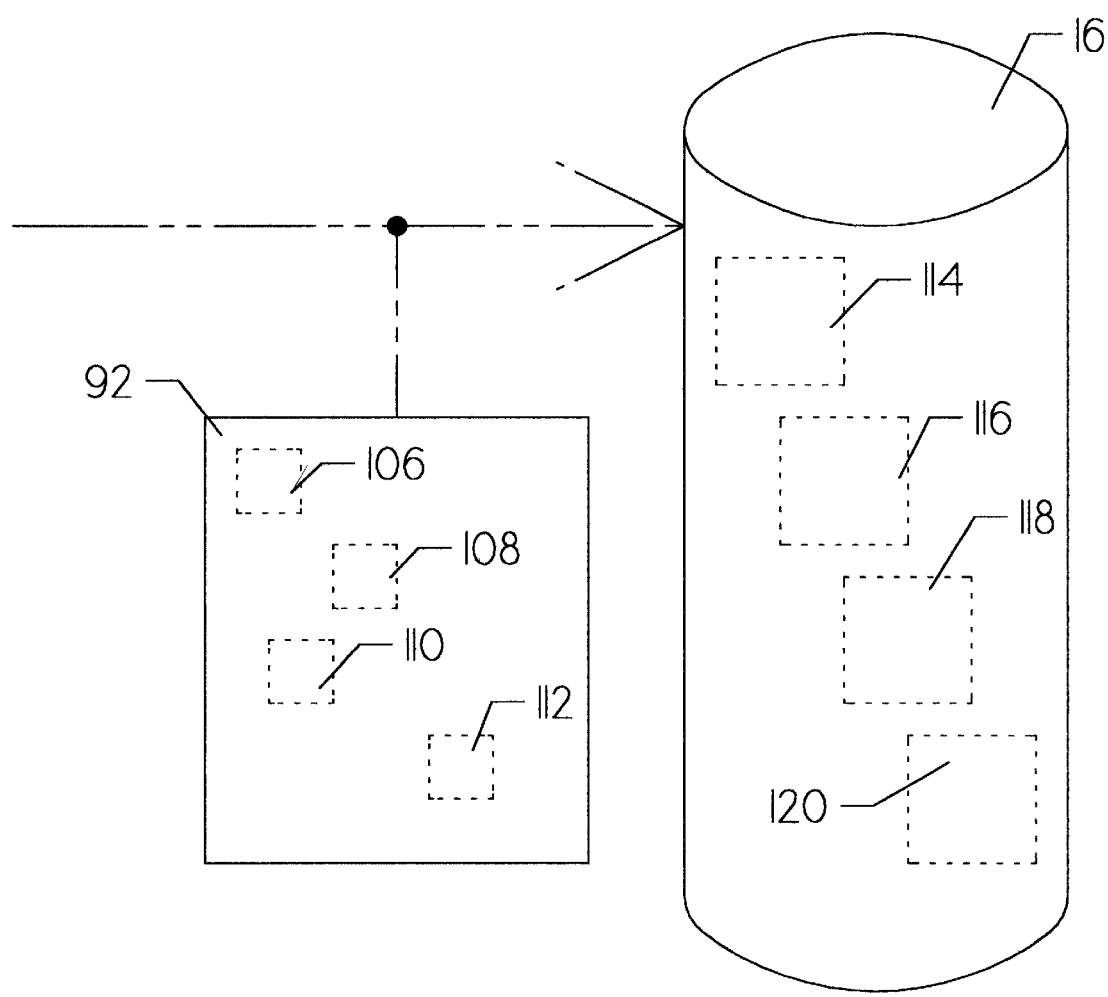
FIG. 6 is a schematic diagram generally illustrating storage of audit trail information of a physical data base file.
Figure 6A:
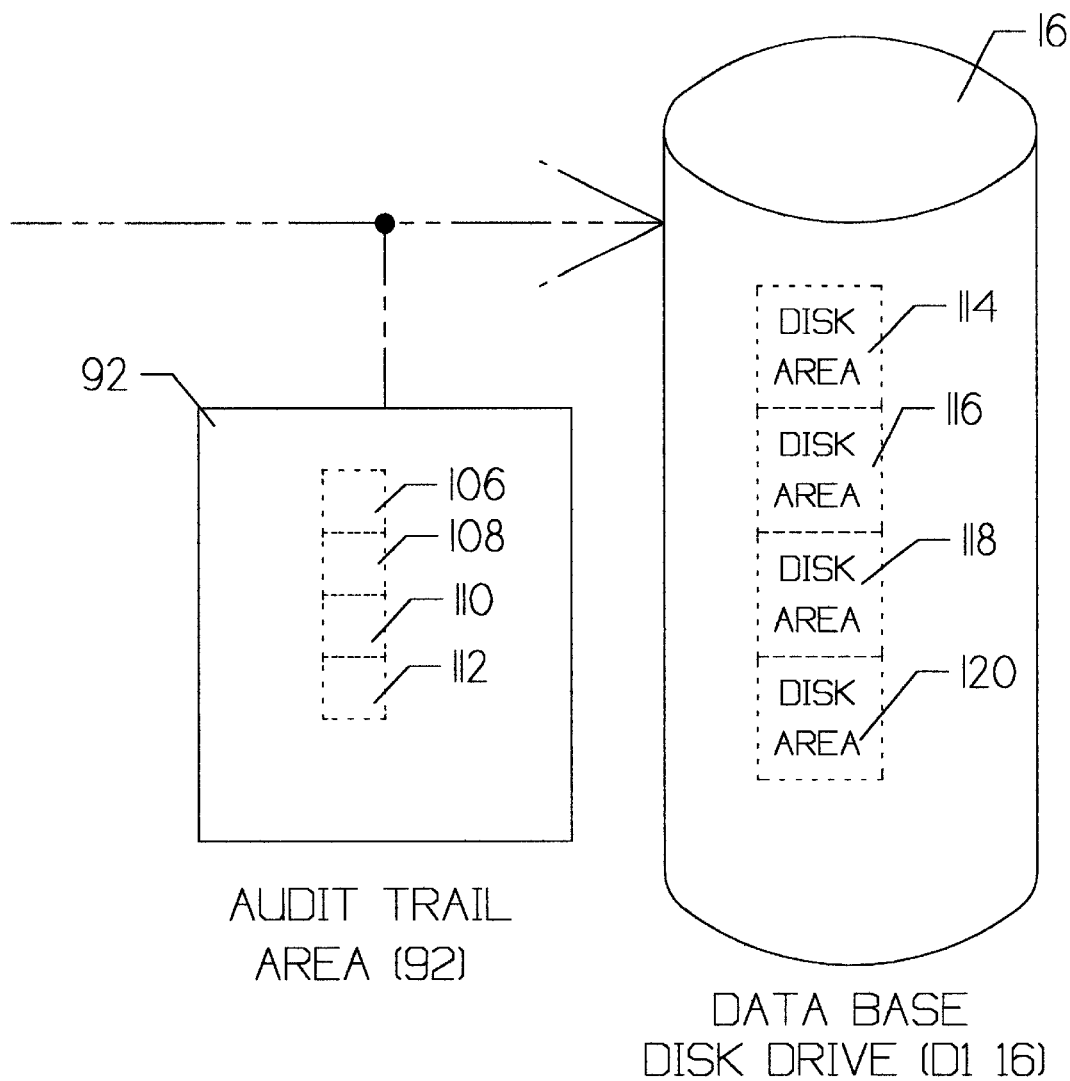
FIG. 6A is a schematic diagram showing storage of the audit trail information of a physical data base file according to the preferred mode of the present invention.

FIG. 6A is a schematic diagram showing the preferred method of compacting the audit trail data. Only physical disk drive D1 16 and associated audit trail storage area 92 of disk drive 90 (see also FIG. 4) is shown for clarity. For the preferred mode of the present invention, element 100 (see FIG. 4) manages the audit storage areas as follows. Audit trail storage area 92 is subdivided to correspond with physical subdivisions of its associated disk drive D1 16. For example, audit storage areas 106, 108, 110, and 112 correspond to disk drive areas 114, 116, 118, and 120, respectively. Thus the audit need contain only the file name, the file index, and the changed data element.

Two points are significant with respect to processing of the transaction audits by the online system. First, only the changed words and indices for the updated data base pages or records are retained in the transaction audits. This reduces the audit volume by not retaining data base words which were not changed by transaction processing.

Second, instead of storing the transaction audits destined for data base disk drive D1 16 sequentially in audit area 92, the transaction audits destined for subdivision 114 within disk drive D1 16 are stored in audit area 106, those destined for subdivision 116 within disk drive D1 16 are stored in audit area 108, etc. Therefore, at any one time, the data base contents for subdivision 114 within disk drive D1 16 can be reconstructed (recovered) from the most recent data base dump for subdivision 114 of disk drive D1 16 as modified by the changed words contained in audit area 106. These changed words are readily accessed and updated using the indices stored directly with the changed words within the audit area 106. Thus the compaction technique not only conserves storage space, but increases recovery speed, because all of the updates (audits for a target disk subdivision) have a high probability of being contained in main memory during recovery. When all the updates are in main memory, there needs to be only one pass through the data base dump to do recovery (see also the explanation to FIG. 8).

FIG. 6B is a variation of schematic diagram FIG. 6A to clarify that the present invention is not limited to segregation of audit trail information by physical disk as shown in the example of FIG. 6A. The explanation for FIG. 6B is similar to that for FIG. 6A with the exception of how element 100 (see also FIG. 4) manages the audit storage areas. Instead of using audit trail storage area subdivisions which correspond to physical subdivisions of an associated disk drive, the audit trail area subdivisions correspond to logical files, which may reside on one or more physical disk drives. For illustration purposes, suppose audit trail area 106 corresponds to logical file 114 which physically resides on data base disk drives D1 16 and D2 18. Audit trail area 108 corresponds to logical file 116, which physically resides on data base disk drive D1 16, and audit trail areas 110 and 112 correspond respectively to logical files 118 and 120 which physically reside on data base disk drive D2 18. Transaction audits destined for logical file 114 are stored by element 100 in audit area 106, and those destined for logical file 116 are stored in audit area 108. Those destined for logical file 118 are stored in audit area 110, and those destined for logical file 120 are stored in audit area 112.

It should be noted that the management of how the audit trail storage areas are correlated with the data base, i.e. by physical disk drive or by logical file, is controlled by element 100 and is a matter of design choice. The rest of the online processing elements are not aware of what audit storage algorithm is in use.

Figure 7:
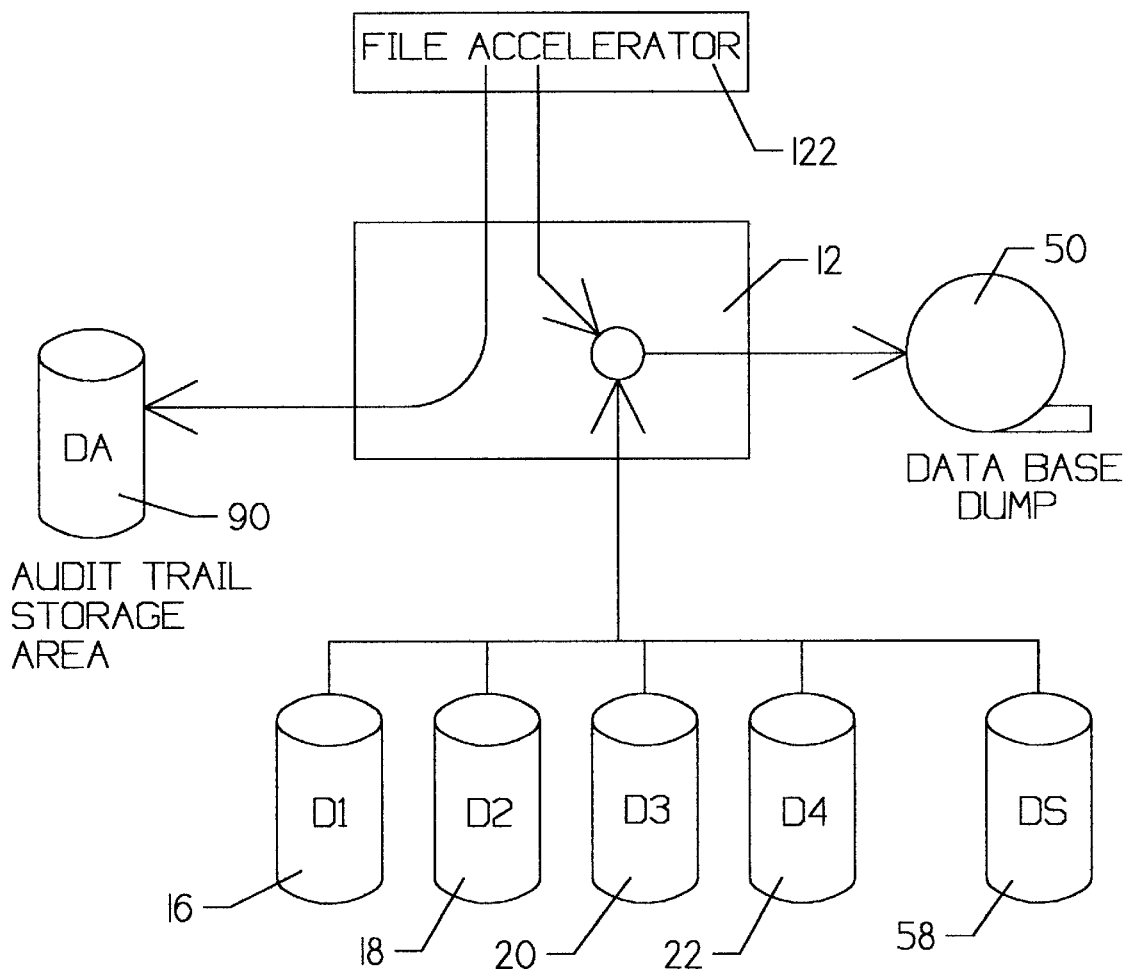
FIG. 7 is a block diagram showing data flow during normal operation according to the preferred mode of the present invention.

FIG. 7 is a block diagram of the normal operation of the preferred mode. Transactions are processed using an extended processing complex resilient memory file accelerator 122 constructed in accordance with the above identified and incorporated commonly assigned co-pending U.S. Patent Application. For the purposes of the present invention, file accelerator 122 is a transaction oriented associative memory.

The file accelerator provides two significant benefits with regard to transaction audits in conjunction with the present invention. The first benefit is compaction of the data base audits which allows them to be retained on audit trail disk during normal operations (see also FIG. 4, element 90) and in host computer main memory storage area during recovery operations (see also FIG. 8, element 126). The second benefit is buffering of each transaction's data base audits until the transaction completes with success or with error before storing them in the audit trail table within the file accelerator (see also FIG. 9, element 140). The success or error completion status for the transaction is important to recovery which must determine if it is appropriate or not to apply the data base audits to the data base being recovered. By having the transactions's audits buffered by the file accelerator, all of the transactions data base audits typically appear contiguously with the transactions's completion status when the audits are destaged from the file accelerator to the host software which manages the audit trail information areas (see also FIG. 4, element 100).

The final results of the transactions are actually processed (i.e. computed) within file accelerator 122 with the results (i.e. the compacted/buffered audits) forwarded to host computer 12 (see also FIG. 4, element 100). From there the associated logical file from the appropriate physical disk drive (i.e. D1 16, D2 18, D3 20, or D4 22) is accessed, updated, and rewritten to the physical disk drive. The data base dump (note only magnetic tape 50 is shown for clarity) is made whenever the associated audit trail information storage area of disk drive 90 becomes full or when the dumping facility is idle. The words changed in the logical records or pages, along with location indices, are transferred to disk drive 90 for storage in the appropriate audit trail information storage area as discussed above. All other referenced elements are as previously described.

Figure 8:
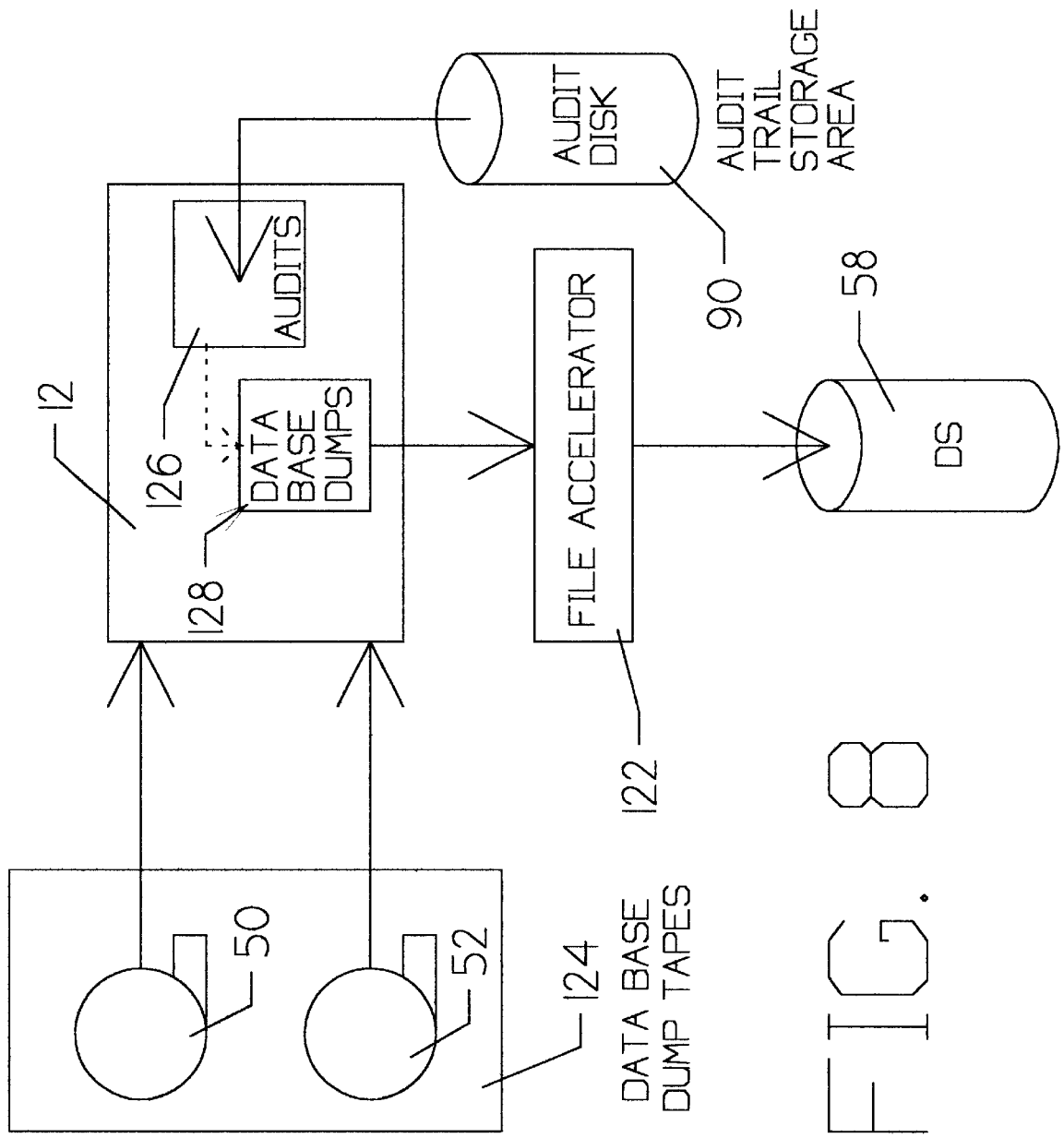
FIG. 8 is a block diagram showing data flow during recovery according to the preferred mode of the present invention.

FIG. 8 is a similar block diagram (see also FIG. 4) showing data base recovery after failure of one of the physical disk drives (i.e. D1 16, D2 18, D3 20, or D4 22) or after failure of a logical file. Upon failure detection, the corresponding magnetic dump tape (note only tapes 50 and 52 are shown in dump library 124 with this view) is selected, positioned, and read. Similarly, the corresponding audit trail information storage area for the failed disk drive (or logical file) 90 is read into host computer main memory storage area 126. As each sequential portion of the data base dump tape is read into host computer main memory storage area 128, storage area 126 is queried to see if any change words are found for that portion of the file. If not, the portion of the file is transferred via file accelerator 122 to spare disk drive 58 without modification. However, if storage area 126 contains change words for the portion of the file, host 12 accesses the file within buffer area 128 and over stores the words indicated by the indices associated with the audit word(s) changed to modify the portion of the file before it is transferred to file accelerator 122 for destaging to spare disk drive 58.

As explained above, disk drive 90 can be used for storage of the audit trail information because of the compaction. Furthermore, because disk drive 90 is randomly accessible, it can be utilized for normal operation in parallel with the recovery process. Also because it is random access, it can be used to load only a selected portion of the audit trail information if storage area 126 has less capacity than the audit trail information storage area for the failed disk drive (or logical file) 90.

Figure 9:
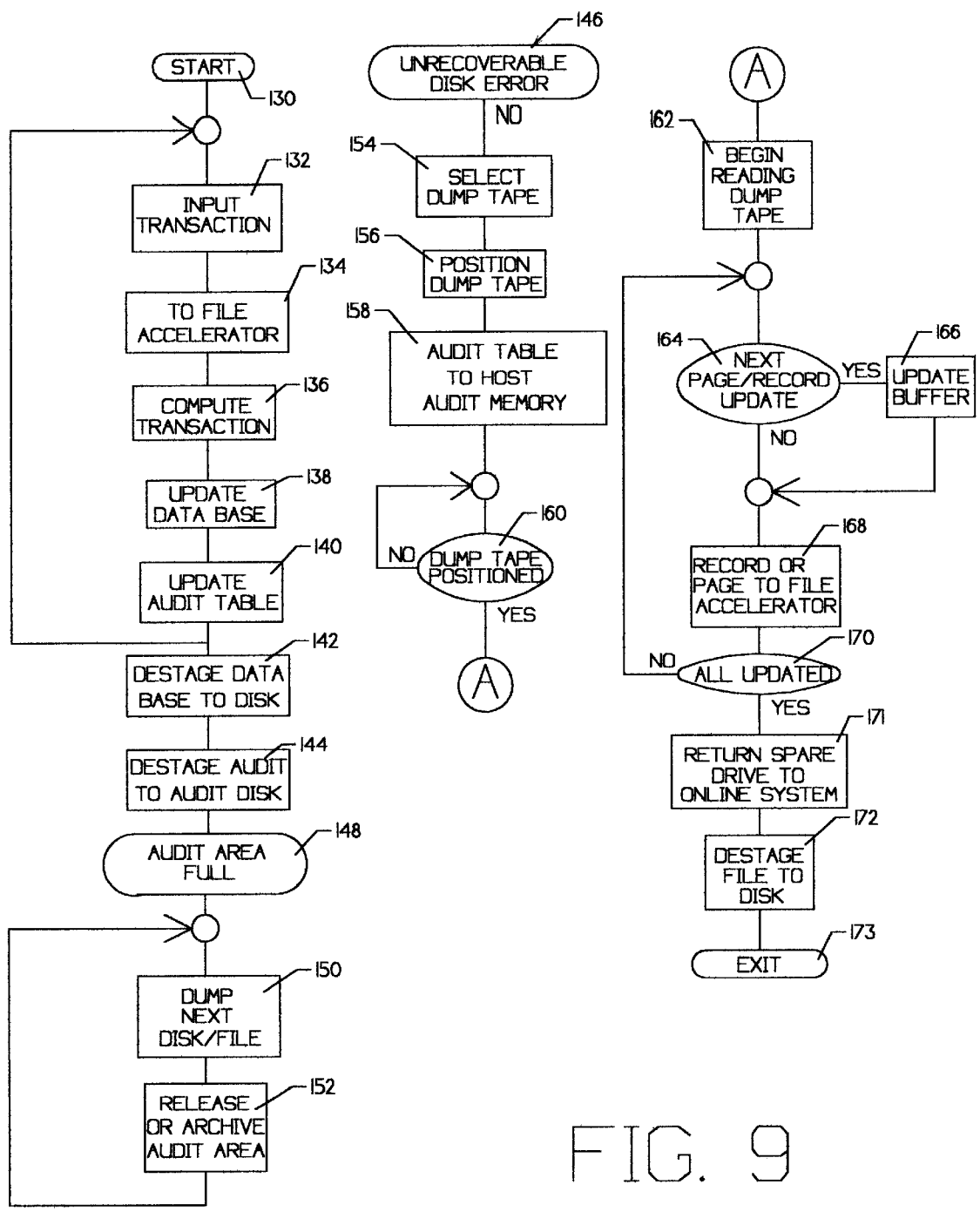
FIG. 9 is a flow chart showing the logical control according to the preferred mode of the present invention.

FIG. 9 is a flow chart showing operation of the present invention. Element 130 provides the entry to the normal transaction processing logic. The next transaction's changed data base records or pages are placed into file accelerator 122 (see also FIG. 7) by element 134, and computed at element 136. Element 138 updates the data base (i.e. logical file) copy within the file accelerator. The audit change words and indices are stored sequentially with respect to other executing transactions in the audit trail table within the file accelerator by element 140. The transaction is logically complete at this point and processing of the next transaction's data base changes continues independently of the processing by elements 142 and 144. Element 142 destages the file accelerator copy of the logical data base file(s) to the corresponding physical data base disk drives. Element 144 destages the audit trail table from the file accelerator to software element 100 (see FIG. 4) which segregates the audit change words/indices and writes them to their corresponding audit trail information areas on the audit disk drive according to the design choice.

Whenever the recently updated audit trail information storage area has reached capacity (i.e. 92, 94, 96, or 98) or after an appropriate time delay and the audit facility is idle, a data base dump is initiated at element 148. Element 150 dumps the next physical disk drive (i.e., D1 16, D2 18, D3 20, or D4 22) or logical file to the associated one of the magnetic dump tapes (i.e., 50, 52, 54, or 56). After the dump has been accomplished, element 152 releases the full audit trail information storage area to be cleared and refilled. The audit trail storage area can be optionally archived to tape before being cleared and refilled. The data base dump process continues independently of transaction processing.

Unrecoverable disk errors are identified using known hardware error indications and failure of any retry attempt. The recovery process is initiated at element 146. Element 154 selects the dump tape corresponding to the failed physical disk drive or logical file. Element 156 positions the dump tape, and element 158 transfers the associated audit trail information from disk drive 90 to audit memory of host computer 12. Element 160 ensures that the dump tape is correctly positioned before the recovery process continues.

From the beginning of the magnetic dump tape, element 162 initiates the reading process. As each sequential portion (records or pages) of the dump tape is read into the buffer of host computer 12, element 164 queries the audit trail information area(s) to determine whether any words have been changed. If yes, element 166 performs the modifications on the fly. This is easily done by using the indices to change the required locations within the buffer of host computer 12. Element 168 transfers the now current buffer records or pages to the file accelerator, and element 170 determines whether all portions (records or pages) of the dump tapes have been processed. If not, control is returned to element 164 for processing of the next sequential portion (records or pages). If yes, the recovery is complete and spare disk 58 is made available to the online system via element 171 for processing of the next transaction. The file accelerator subsequently destages the updated data base information to the spare disk drive 58 by element 172 as necessary. It is not necessary for the next transactions to wait for the updated data base information to be destaged. Recovery processing exit is via element 173.

The present invention is not limited to recovery processing by a single sequence of steps. In the case where the data base dump for the failed disk (or logical file) is contained on multiple mutually-exclusive dump tapes, then parallel step sequences can be started for steps 154 through 170 for each dump tape. Steps 171 through 173 occur only when all parallel sequences have completed. For example, if dump tape 50A contained data for the first half of the failed disk and dump tape 50B contained data for the second half, then two parallel recovery step sequences could be started—one to perform steps 154 through 170 for dump tape 50A and a second to perform steps 154 through 170 for dump tape 50B. Steps 171 through 173 occur only after step 170 completes for both dump tapes 50A and 50B.

Having thus described the preferred embodiments of the present invention, those of skill in the art will be readily able to apply the teachings found herein to yet other embodiments within the scope of the claims hereto attached and wherein:

We claim:

1. In a digital data processing system for posting transactions to a data base wherein the data base is stored on a plurality of separate storage elements, the improvement comprising:
   a. generating means for generating transaction records and compiling said transaction records into audit trail data corresponding to each of said transactions;
   b. separating means responsively coupled to said generating means for separating said audit trail data generated for each of said transactions according to a corresponding one of the plurality of separate storage elements such that said separated audit trail data corresponds to said corresponding one of the plurality of separate storage elements; and
   c. storing means responsively coupled to said separating means for separately storing said separated audit trail data such that said separately stored separated audit trail data corresponds to said corresponding one of the plurality of separate storage elements.

2. The improvement according to claim 1 wherein said generating means includes compacting means for compacting said audit trail data.

3. The improvement according to claim 2 wherein said compacting means includes identifying means for identifying changed words within a file of the data base.

4. A method of recovering a data base from a failure of at least one of a plurality of physical disk drives wherein the plurality of physical disk drives are coupled to a transaction based data processing system utilizing a plurality of transactions, the at least one of the plurality of physical disk drives storing contents, said method comprising the steps of:
   a. generating a plurality of transaction records and compiling each of said plurality of transaction records into an audit trail record upon processing each of said plurality of transactions, said audit trail record having a plurality of portions wherein each of the plurality of portions corresponds to one of the plurality of transactions, each of said plurality of transaction records comprising at least one changed word having a content and a location therein;
   b. storing said plurality of portions of said audit trail record in a plurality of separate audit trail storage areas, each of said plurality of separate audit trail storage areas being coupled to a corresponding one of said plurality of physical disk drives, each of said plurality of transactions being associated with one of said plurality of physical disk drives and thus being associated with a corresponding one of said plurality of separate audit trail storage areas, said storing step (b) storing each of said plurality of portions of said audit trail record in a corresponding one of said plurality of separate audit trail storage areas;

c. dumping each of the plurality of physical disk drives to a different one of a plurality of redundant storage facilities before the failure of said at least one of the plurality of physical disk drives, said plurality of redundant storage facilities being coupled to said plurality of physical disk drives; and d. reconstructing the contents of the at least one of said plurality of physical disk drives after the failure of the at least one of the plurality of physical disk drives using a corresponding one of said plurality of redundant storage facilities and using said corresponding one of said plurality of separate audit trail storage areas.

5. A method according to claim 4 wherein said generating step includes compacting each of the plurality of transaction records to produce said audit trail record.

6. A method according to claim 5 wherein said compacting step includes identifying the content and the location of said at least one changed word within a file of the plurality of transaction records.

7. A method according to claim 4, 5, or, 6 wherein said dumping step for any one of said multiple disk drives occurs whenever the corresponding one of said plurality of separate audit trail storage areas reaches a predetermined size.

8. A method according to claim 7 wherein said reconstructing comprises:
   a. sequentially reading a file from said corresponding one of said plurality of redundant storage facilities;
   b. accessing said corresponding one of said plurality of separate audit trail storage areas to determine if said file has been modified;
   c. updating said file if said accessing step determines that said file has been modified;
   d. storing said file on a spare disk drive, said spare disk drive being coupled to said plurality of physical disk drives; and
   e. completing steps a–d for each file from said corresponding one of said redundant storage facilities.

9. A method according to claim 4, 5, or 6 wherein said reconstructing comprises:
   a. sequentially reading a file from said corresponding one of said plurality of redundant storage facilities;
   b. accessing said corresponding one of said plurality of separate audit trail storage areas to determine if said file has been modified;
   c. updating said file if said accessing step determines that said file has been modified;
   d. storing said file on a spare disk drive, said spare disk drive being coupled to said plurality of physical disk drives; and
   e. completing steps a–d for each file from said corresponding one of said redundant storage facilities.

10. An apparatus comprising:
    a. a plurality of storage devices for storing a data base;
    b. transaction processing system coupled to said plurality of storage devices for modifying said data base in response to a series of transactions;
    c. an audit trail storage area coupled to said transaction processing system for storing a record of said modifying of said data base in response to said series of transactions; and
    d. a data base dump facility coupled to said transaction processing system for storing said data base in response to a filling of said audit trail storage area.

11. An apparatus according to claim 10 wherein said audit trail storage area is segregated into a plurality of individual audit trail storage areas and wherein each of said plurality of individual audit trail storage areas corresponds to a different one of said plurality of storage devices.

12. In a digital data processing system having a plurality of separate storage elements wherein said plurality of separate storage elements store a data base, said digital data processing system posting transactions to the data base, the improvement comprising:
    a. a processor which is programmed for generating a plurality of transaction records and compiling each of said plurality of transaction records into audit trail data corresponding to each of the transactions, each of said plurality of transaction records comprising at least one changed word having a content and a location therein;
    b. a segregating circuit coupled to said processor for segregating the audit trail data prepared for each of the transactions according to a corresponding one of the plurality of separate storage elements such that said segregated audit trail data corresponds to said corresponding one of the plurality of separate storage elements; and
    c. a plurality of memory elements coupled to said segregating circuitry for separately storing the segregated audit trail data such that said separately stored segregated audit trail data corresponds to said corresponding one of the plurality of separate storage elements.

13. The improvement according to claim 12 wherein said processor is programmed for compacting the audit trail data.

14. The improvement according to claim 13 wherein said processor is programmed to compact the audit trail data by identifying changed words within a file of the data base.

15. In a digital data processing system having a plurality of separate storage elements wherein said plurality of separate storage elements store a data base, said digital data processing system posting transactions to the data base, the improvement comprising:
    a. a processor which is programmed for generating a plurality of transaction records and compiling each of said plurality of transaction records into audit trail data corresponding to each of the transactions, each of said plurality of transaction records comprising at least one changed word having a content and a location therein;
    b. a segregating circuit coupled to said processor for segregating the audit trail data prepared for each of the transactions according to a corresponding one of a plurality of files within the data base; and
    c. a plurality of memory elements coupled to said segregating circuitry for separately storing the segregated audit trail data.

16. A method of recovering a data base from a failure of at least one of a plurality of logical files wherein the plurality of logical files are coupled to a transaction based data processing system utilizing a plurality of transactions, the at least one of the plurality of logical files storing contents, said method comprising the steps of:
    a. generating a plurality of transaction records and compiling each of said plurality of transaction records into an audit trail record upon processing each of said plurality of transactions, said audit trail record having a plurality of portions wherein each of the plurality of portions corresponds to one of the plurality of transactions, each of said plurality of transaction records comprising at least one changed word having a content and a location therein;

b. storing said plurality of portions of said audit trail record in a plurality of separate audit trail storage areas, each of said plurality of separate audit trail storage areas being coupled to a corresponding one of said plurality of logical files, each of said plurality of transactions being associated with one of said plurality of logical files and thus being associated with a corresponding one of said plurality of separate audit trail storage areas, said storing step (b) storing each of said plurality of portions of said audit trail record in a corresponding one of said plurality of separate audit trail storage areas;

c. dumping each of the plurality of logical files to a different one of a plurality of redundant storage facilities before the failure of said at least one of the plurality of logical files, said plurality of redundant storage facilities being coupled to said plurality of logical files; and d. reconstructing the contents of the at least one of said plurality of logical files after the failure of the at least one of the plurality of logical files using a corresponding one of said plurality of redundant storage facilities and using said corresponding one of said plurality of separate audit trail storage areas.

17. A method according to claim 16 wherein said generating step includes compacting each of the plurality of transaction records to produce said audit trail record.

18. A method according to claim 17 wherein said compacting step includes identifying the content and the location of said at least one changed word within a file of the plurality of transaction records.

19. A method according to claim 16, 17, or 18 wherein said dumping step for any one of said plurality of logical files occurs whenever the corresponding one of said plurality of separate audit trail storage areas reaches a predetermined size.

20. In a digital data processing system for posting transactions to a data base wherein the data base is stored on a plurality of separate storage elements, the improvement comprising:

a. generating means for generating transaction records and compiling said transaction records into audit trail data corresponding to each of said transactions;

b. separating means responsively coupled to said generating means for separating said audit trail data generated for each of said transactions according to a corresponding one of the plurality of separate storage elements;

c. storing means responsively coupled to said separating means for separately storing said separated audit trail data;

d. compacting means responsively coupled to said generating means for compacting said audit trail data;

e. identifying means responsively coupled to said compacting means for identifying changed words within a file of the data base; and f. index computing means responsively coupled to said identifying means for computing indices within said file of said data base for identifying said changed words.

21. The improvement according to claim 20 wherein said generating means comprises the contents of said changed words within said file of the data base.

22. The improvement according to claim 1, 2, 3, 21, or 20 further comprising:

a. redundantly storing means coupled to the plurality of storage elements and further coupled to a plurality of redundant storage elements for redundantly storing the data base in said plurality of redundant storage elements; and b. initiating means coupled to said redundantly storing means and said storing means for initiating said redundantly storing of one of said plurality of storage elements whenever a total of the corresponding audit trail data stored in said storing means reaches a predetermined size.

23. In a digital data processing system having a plurality of separate storage elements wherein said plurality of separate storage elements store a data base, said digital data processing system posting transactions to the data base, the improvement comprising:

a. a processor which is programmed for generating a plurality of transaction records and compiling each of said plurality of transaction records into audit trail data corresponding to each of the transactions, each of said plurality of transaction records comprising at least one changed word having a content and a location therein;

b. a segregating circuit coupled to said processor for segregating said audit trail data prepared for each of the transactions according to a corresponding one of the plurality of separate storage elements;

c. a plurality of memory elements coupled to said segregating circuit for separately storing the segregated said audit trail data; and d. said processor further programmed to compact said audit trail data by identifying said at least one changed word within a file of said data base by computing indices of said changed words within said file of said data base.

24. The improvement according to claim 23 wherein said processor is programmed to prepare an audit trail comprising the contents of the at least one changed word within the file of the data base.

25. The improvement according to claim 12, 13, 14, 24, or 23 further comprising:

a. a plurality of redundant storage elements coupled to the plurality of separate storage elements for redundantly storing the data base; and b. a detecting circuit coupled to said plurality of redundant storage elements, the plurality of separate storage elements and to said plurality of memory elements for storing one of the plurality of storage elements to one of said plurality of redundant storage elements whenever said detecting circuit detects a total of the audit trail data stored in one of said plurality of memory elements reaches a predetermined size.

* * * * *